INVENTOR.
GORDON J. BERRY, JR.

INVENTOR.
GORDON J. BERRY, JR.

Dec. 12, 1972   G. J. BERRY, JR   3,705,994
ELECTRICAL MACHINE FRAME

Filed Feb. 18, 1971   3 Sheets-Sheet 3

INVENTOR.
GORDON J. BERRY, JR.
BY
Meyer, Tilberry & Body
ATTORNEYS

United States Patent Office 3,705,994
Patented Dec. 12, 1972

3,705,994
ELECTRICAL MACHINE FRAME
Gordon J. Berry, Jr., Novelty, Ohio, assignor to
Portec Inc., Cleveland, Ohio
Filed Feb. 18, 1971, Ser. No. 116,403
Int. Cl. H02k 5/00
U.S. Cl. 310—91                           14 Claims

ABSTRACT OF THE DISCLOSURE

A frame for large electrical machines comprised of a rotor and a stator and means for mounting the rotor relative to the stator. The mounting means or frame is comprised of two spaced apart end bracket plates and longitudinally extending angle iron connecting members. The end bracket plates are each fabricated from a plurality of laminations stamped from relatively thin metal to the desired ultimate dimensions and with the necessary openings therethrough. The laminations are placed in a side by side relationship and welded together to form an integral unit. The component parts are all assembled in their final operative position and angle iron connecting members are welded to the end bracket plates and the stator so as to rigidly hold the parts in the assembled position.

---

This application pertains to the art of electrical machines and more particularly to a frame for rotating electrical machines.

The invention is particularly applicable as a mounting frame for large rotating electric generators and will be described with particular reference thereto; however, it will be appreciated that the invention has broader applications and may be used for large electric motors as well as other apparatus wherein a basic framework having one or more end bracket plates is required.

Large electrical machines of the type to which the subject invention is particularly applicable generally comprising a stator, a rotor positioned in a precise spaced relationship relative to the stator, end bracket plates for supporting the rotor and a shell which surrounds the stator and mates with the end bracket plates.

Heretofore, the end bracket plates were constructed from thick steel plates. The necessity for using these thick plates arose from the fact that many large electrical machines require a frame of over six feet in length having a cross sectional dimension of almost three feet. The end bracket plates must support a mounting shaft on which the rotor is supported for rotation in a precise spaced relationship relative to the stator. Three inch thick plates were often required in order to supply sufficient strength to support the rotor, as well as supply rigidity for the remainder of the frame.

One of the problems encountered with using thick steel plates for the end bracket plates has been the difficulty in shaping them to the specific dimensional relationships required. Because of this thickness, prior end bracket plates were generally torch cut to the requisite dimensions and recess areas. Torch cutting, of course, is an extremely slow and inaccurate cutting process such that following cutting, it was necessary to machine certain of the torch cut areas to provide acceptable dimensions which would mate with other parts of the frame resulting in additional time and cost expenditures for manufacturing the machine frames.

It has been suggested, as an alternative to the above described method to cast or forge the end bracket plates to the proper size with the necessary recess areas formed integral therein. However, inherent in the use of both of these approaches remains the need for substantial machining so as to provide the required surface finishes for mating with the remainder of the frame members and the shaft receiving recesses. Further, the cost of either forging or casting proved to be substantially higher than using the thick steel torch cut plates.

Another problem encountered with previous machine frames was that the stator supporting members extending between the end bracket plates were required to be extremely heavy in order to provide rigidity to the frame, and oftentimes the required rigidity was only supplied when cross members extending between the connecting members were employed. Again, this added cost and construction time to the frames. This problem arose in that the stator was not made integral with the frame itself but was merely supported thereby.

The present invention contemplates a new and improved frame for large electrical machines which overcomes all of the above referred problems and others and provides a frame which is more economical and easier to manufacture and requires less time for assembly than the previously utilized frame structures.

In accordance with the present invention, there is provided an end bracket plate construction for use in large electrical machines comprising a plurality of identical thin laminations in side by side relationship and welded together to form an integral plate. The laminations are thin enough to allow them to be stamped from sheet metal to the ultimate shape in one press operation.

In accordance with a further aspect of the present invention, there is provided a frame structure in which the stator laminations are welded to a plurality of longitudinally extending frame members which extend beyond the stator and are fastened to the end bracket plates whereby a frame of maximum rigidity is provided.

In accordance with yet another aspect of the present invention, there is provided a method of assembly for large electrical machines comprising the steps of positioning the rotor, stator, end plates and a plurality of longitudinally extending frame members in their final operative position using jigs and shims then welding the frame members to the end plates and to the stator, then removing the jigs and shims.

The principal object of the invention is the provision of a new and improved mounting frame for large electrical machines.

Another object of the present invention is the provision of a new and improved mounting frame for large electrical machines which is less expensive to manufacture and which decreases machining and assembly time.

Still another object of the present invention is the provision of a new and improved mounting frame for large electrical machines wherein the stator core is welded to the frame so as to add rigidity to the frame.

Yet another object of the present invention is the provision of a new and improved end bracket plate fabricated from a plurality of laminations each thin enough to be stamped the ultimate shape.

Another object of the invention is the provision of a new and improved heavy end plate construction for electric motors and generators which may be shaped to the ultimate dimensions by a stamping process.

Another object of the invention is the provision of a new and improved mounting frame wherein the component parts do not require any machining.

Another object of the invention is the provision of a new and improved frame wherein the longitudinally extending frame members are made from inexpensive hot or cold rolled angle iron members which need only be cut to length.

Another object is the provision of a new and improved frame for an electric motor or generator wherein the abutting surfaces of the component parts do not have to be machined.

Yet another object of the present invention is the provision of a new and improved method of assembly for a large electrical machine which method enables proper alignment of the rotor and stator with a minimum of effort and using parts which require a minimum of machining.

The invention may take physical form in certain parts and arrangements of parts, a preferred embodiment of which will be described in detail in the specification and illustrated in the accompanying drawings which form a part hereof and wherein.

Figures 1, 2:
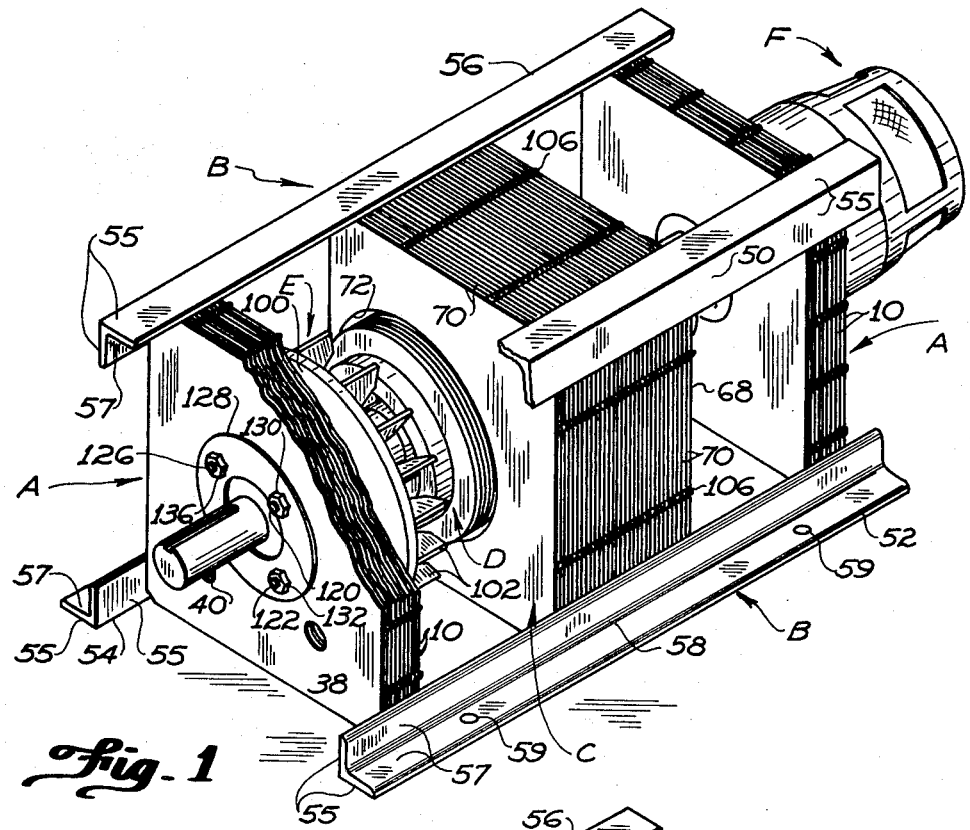
FIG. 1 is a perspective view of a large generator for which the subject invention is particularly adapted having a portion thereof removed for ease of illustration of the invention.
FIG. 2 is a perspective view of the generator shown in FIG. 1 with the rotor assembly removed for ease of illustration.

Referring now to the drawings, wherein the showings are for the purposes of illustrating a preferred embodiment of the invention only and not for purposes of limiting same, the figures show a large electric generator including a pair of spaced apart end bracket plates A, connecting members B, stator assembly C, rotor assembly D, fan assembly E and motor F.

Rotor assembly D includes a rotor portion 80 comprised of a stack of a plurality of individual laminations 82 mounted on rotor shaft 84 having at the ends thereof reduced diameter bearing receiving portions 86, 88. The specific construction of rotor assembly D is commensurate with those constructions already known and accepted in the electrical machine art but which do not form a part of the present invention and are not shown in the drawings. It will also be understood that rotor shaft 84 could have other specific diameter dimensions which could be used in practicing the concepts of the subject invention. It is to be noted that rotor shaft 84 and its supporting bearings are the only machined components in the generator.

Fan assembly E is disposed at one end of rotor shaft 84 immediately adjacent bearing receiving portion 86 and provides means for cooling the operation of the generator. Although this fan could be of many types, in the preferred embodiment, it is comprised of a fan body 100 having a plurality of outwardly extending fan blades 102 mounted thereon. Fan body 100 may be affixed to the rotor shaft in any convenient known means.

Motor F is used to supply the power to the rotor assembly of the generator shown in the preferred embodiment and could be of several types used in generator environments.

Stator assembly C includes a stator core portion 68 which is comprised of a stack of a plurality of generally identical rectangular laminations, each having a rotor receiving recess 72 therein. The dimensional characteristics of each lamination 70 is generally identical with the outside dimensions of end plates A. Laminations 70 also have chamfered corners (not shown) to facilitate ease of mating with connecting members B as will appear hereinafter. The specific number of laminations 70 required to form stator core portion 68 may be determined by the requirements of the machine itself. Stator assembly C also includes the necessary wiring and other component parts which are well known and generally form a part of a stator assembly but which do not form a part of the present invention and are not shown in the drawings.

Figure 4:
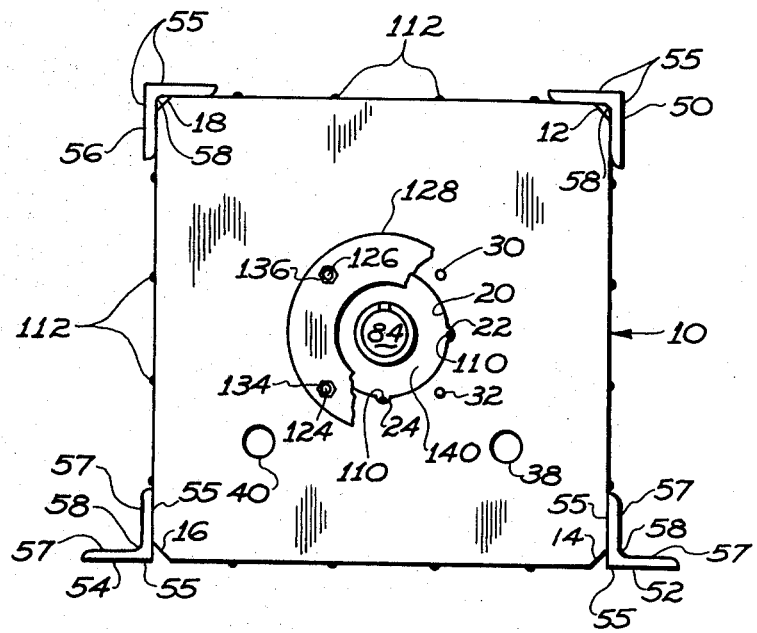
FIG. 4 is a front view of the generator shown in FIG. 1 with a portion of the bearing retaining bracket removed for ease of illustration.

In the preferred embodiment, connecting members B comprise angle iron members 50, 52, 54, 56. As best shown in FIGS. 1, 2 and 4, these angle iron members have leg portions which extend equidistantly with each other.

These angle iron members may be formed by bending a long strip of steel along its longitudinal dimension but in the preferred embodiment are standard hot rolled commercially available angle irons having outer surfaces 55 which are at right angles to each other and inner surfaces 57 which diverge from the outer surfaces 55 toward the apex and are joined by a radiused surface 58. It will be appreciated that any angled members or straight members could be utilized for the connecting members while still utilizing the concepts of the subject invention. The assembly of connecting members B with the generator itself is more fully disclosed hereinbelow.

Figure 5:
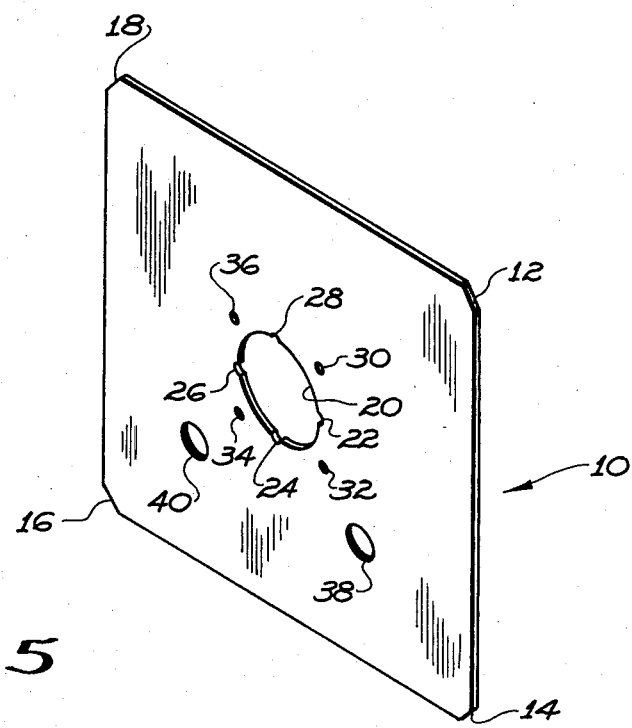
FIG. 5 is a perspective view showing a single lamination used in forming the end bracket plates.

Each end bracket plate A is, in accordance with the invention, comprised of, and as best shown in FIG. 5, a stack of a plurality of generally rectangular laminations 10 having chamfered corners 12, 14, 16 and 18. The laminations are made from metal which is thin enough to permit each lamination to be stamped in one press operation and identical for both end bracket plates A. Reference will be made to one of these laminations, it being understood that the other laminations are identical thereto unless specifically noted. The lamination shown in FIG. 5 also includes a rotor shaft bearing receiving recess 20, welding slots 22, 24, 26 and 28, bearing retaining bracket mounting holes 30, 32, 34 and 36 and air gap setting gage receiving holes 38, 40. In the preferred embodiment of the subject invention, the laminations are stamped from 16 gage cold rolled steel to include the above chamfers, recesses and slots integral therewith. It is to be understood that other gage steels could also be utilized in practicing the subject invention and it is practical for use with any gage which may be stamped to include the required recesses in one operation.

The chamfered corners merely provide a clearance for mating with the inner surfaces 57, 58 of connecting members B. Rotor shaft bearing receiving recess 20 is stamped to a size which will receive the rotor shaft bearings in a tight fit relationship therewith. Welding slots 22, 24, 26 and 28, spaced equidistantly around recess 20, are arcuate in shape and extend outwardly from the receiving recess. The bearing retaining bracket mounting holes are used to affix a bearing retaining bracket to end bracket plates A, and in the preferred embodiment, four such holes are utilized, it being understood that this number could be increased or decreased as dictated by the nature of the electrical machine itself. Receiving holes 38, 40 are spaced in the lower portion of the lamination and are required to be in a longitudinally aligned relationship with the air gap which is formed between stator assembly C and rotor assembly D as will be more fully described hereinafter.

Of particular importance to the subject invention is the mode of assembly of the generator unit itself using the component parts as hereinabove described. First, stator assembly C is fabricated by placing a plurality of laminations 70 which comprise stator core portion 68 in a side by side relationship so that the outer surfaces and rotor receiving recesses 72 are in alignment. The most convenient way to complete this step is to provide an assembly fixture wherein the laminations may be stacked in the proper relative relationships and then apply opposing forces at opposite ends of the stack to assure they will be closely spaced in their side by side relationship. In the preferred embodiment, a plurality of longitudinally extending weld beads 106 are utilized as the joining means, although it is to be understood that other means such as epoxy glue or bolts could be used. As shown best in FIGS. 1 and 2, stator core portion 68 has two weld beads 106 extending longitudinally along each side thereof and these beads may be formed by any convenient welding means. Although stator core portion 68 is shown as having two weld beads per side, this number may be increased or decreased as a particular application dictates. Once stator core portion 68 has been fabricated, the other necessary wiring and components may be added to complete fabrication of stator assembly C.

Figure 3:
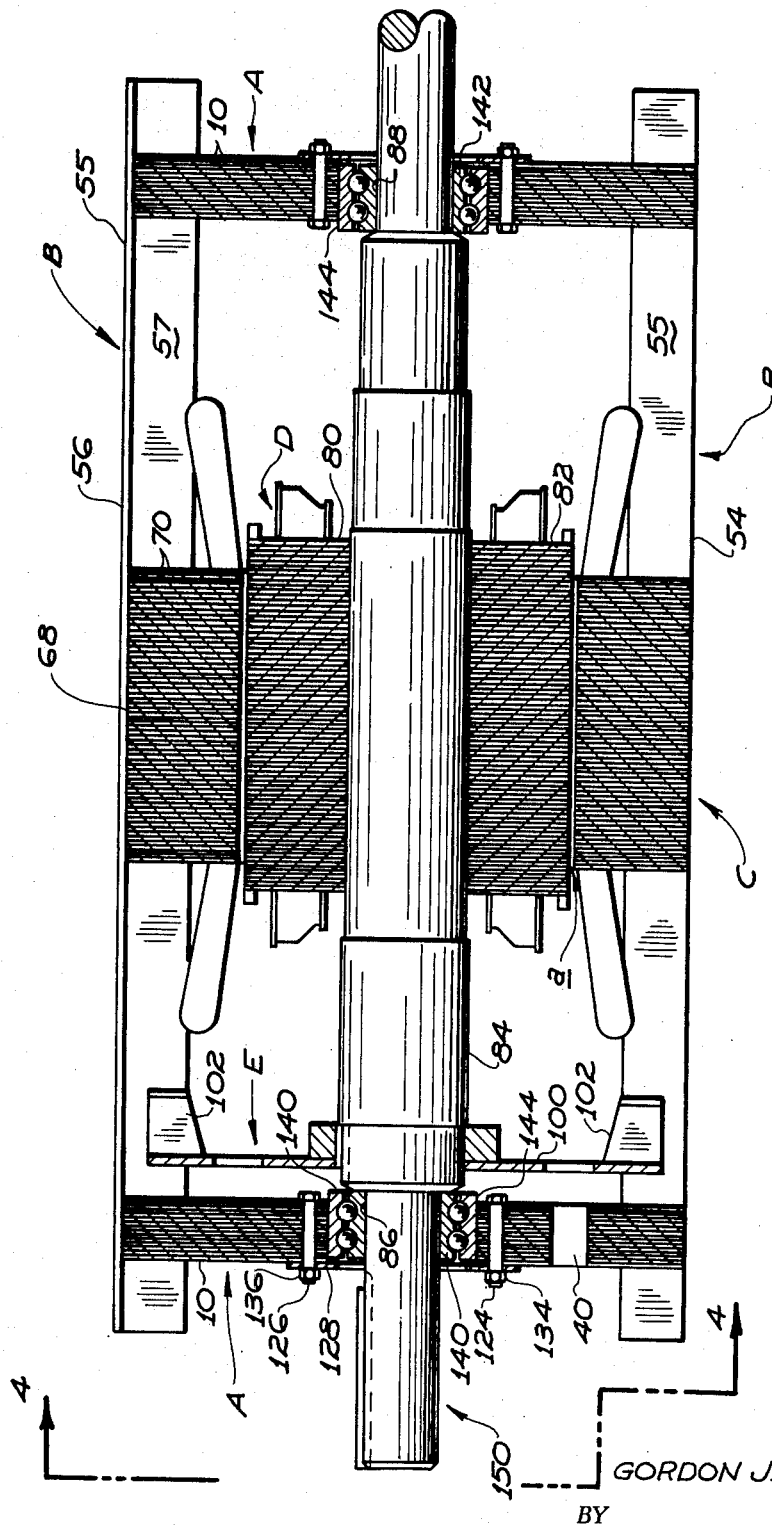
FIG. 3 is a longitudinal cross sectional view of the generator shown in FIG. 1.

Following fabrication of the stator assembly, connecting members B, comprising angle iron members 50, 52, 54, 56, may be joined thereto to provide the basic frame structure. As best shown in FIGS. 1, 2 and 3, the stator assembly is generally centrally located relative to the angle iron members and these angle iron members are generally of equal length. Members 50, 56 are placed relative to the top of stator 68 so that the angle iron is matingly received on the opposed corners of the core portion. As stator core portion 68 has been carefully assembled in an assembly fixture so as to provide the proper dimensional relationships, angle iron members 50, 56 will assume the desired position with a minimum of relocation. Once members 50, 56 have been located, they are welded to stator core portion 68 using any convenient manner best suited for such purposes. Angle iron members 52, 54, which in essence form a base for the machine, are positioned so that one leg of the angle iron members extends outwardly from the frame itself as best shown in FIGS. 1 and 2. Members 52, 54 each include a plurality of mounting holes 59 in the outwardly extending legs thereof to provide means for securing the generator. When positioned relative to stator core portion 68, members 52, 54 are welded thereto using the welding means previously described. As a result, the stator body itself is in effect an integral part of the frame itself as opposed to being merely supported by the framework. This integral relationship, of course, provides stability and great rigidity to the overall structure.

In fabricating rotor assembly D, a plurality of thin laminations 82 are stacked in side by side relationship on rotor shaft 84 to form rotor portion 80. Again, the construction of the rotor, that is, the wiring and other components are not shown in the drawings or disclosed herein in that they are considered well known in the art and do not form a part of the present invention. It need only be understood that rotor portion 80 and the recess formed by the rotor receiving recesses 72 in laminations 70 be of the proper relative dimensions so as to provide a working relationship between the rotor and stator. Rotor portion 80 is received on the rotor shaft in any convenient means known in the art and fan E may also be affixed to the shaft by known means.

The assembly of end bracket plates A forms an important part of the subject invention. The disclosure will be made with reference to one of these end bracket plates, it being understood that the other end bracket plates are identical thereto unless specifically noted. As hereinabove disclosed and in the preferred embodiment shown in FIG. 5, a plurality of laminations 10 stamped from 16 gage steel are preferred. The thickness of the 16 gage steel is .0598 inch such that the laminations, including the necessary recesses therein, may be easily stamped in one press operation in an efficient manner. All laminations are exactly identical. A plurality of these thin laminations are placed in a fixture, similar to the one utilized in fabricating stator portion 68, wherein the laminations are aligned with each other to provide an integral assembly. Oppositely disposed forces are again placed against the end laminations of each plate in order that they will be as closely spaced as possible. In the preferred embodiment, forty of these 16 gage laminations are utilized so as to provide end bracket plates having a thickness of approximately 2½ inches. Obviously, a fewer or greater number of these laminations could be used and the thickness of the individual laminations could also be varied, it only being necessary that it is possible to stamp the laminations with the requisite slots, chamfered corners and clearances in one stamping operation. Once the plurality of laminations are located in the fixture, they are welded along a plurality of inside weld joints 110 and outside weld beads 112, although it is again to be understood that other means such as an epoxy glue or bolts could be used. Inside weld beads 110 may be laid down as required in welding slots 22, 24, 26 and 28 to remain below the outer diameter of rotor shaft bearing receiving recess 20. Outside weld beads 112, in the preferred embodiment, extend longitudinally along four areas on each side of the plate, it being understood that more or less of these joints could be utilized as dictated by the particular needs of the machine. Again, these welds may be performed by any known convenient welding means. Since the plurality of laminations are aligned in the fixture, the chamfered corners, the rotor shaft bearing receiving recesses, the welding slots, the bearing retaining bracket mounting holes and the spacer receiving slots combine to form passages extending longitudinally through the plate. Once the joining of the laminations is complete, the plate may be removed from the fixture for further processing.

First, and if it is required to bring the rotor shaft bearing receiving recesses 20 to the proper dimensional size, they may be Brinelled or treated by any other process utilized in sizing holes. This sizing is to provide an opening which will facilitate a press fit between the surface of rotor shaft bearing receiving recess and a rotor shaft bearing itself. A bearing retaining bracket 128 is mounted on one side of the plate assembly by means of bearing retaining bracket bolts 120, 122, 124 and 126 respectively received in holes 30, 32, 34 and 36. This is best shown in FIGS. 1, 3 and 4 and the bracket itself is merely washer shaped with the inside diameter being less than the diameter of the passage formed by rotor shaft bearing receiving recesses 20.

To assemble the remainder of the generator utilizing the new frame construction, bearings 140, 142 are disposed on bearing receiving portions 86, 88 respectively. The bearings may be selected from any of several types of bearings which are used for similar environments and each includes outside peripheral surface 144 having a diameter which may be associated with recesses 20 in a press fit relationship. Between the rotor and stator of all electrical machines of the type presently under consideration, there is provided an air gap generally designated $a$ in FIG. 3. In the generator shown in the figures, of course, the rotor assembly rotates relative to the stator assembly and it is necessary in order to insure the most efficient machine operation that the dimension of air gap $a$ remains substantially the same circumferentially between the rotor and stator. For this reason, elongated gap setting gages (not shown) are positioned at the bottom of rotor receiving recesses 72 as rotor assembly D is slid into position inside stator assembly C. These gages extend generally outwardly toward the forward end 150 of rotor shaft 84. At this stage of the machine construction, the rotor and stator assemblies have been properly located relative to each other.

Two end bracket plates A which have been fabricated as hereinabove described are slid over the ends of rotor shaft 84 such that bearings 140, 142 are received in a press fit relationship in bearing receiving recesses 20. Bearing retaining brackets 128 prevent the bearings from passing through the bearing receiving recesses. The gap setting gages extend through holes 38, 40 as the end bracket plate for the front end of the unit is slid into position. It should be particularly noted that it is only necessary that gap setting gages extend longitudinally along air gap $a$ and out through one of end bracket plates and not between both end bracket plates.

Once positioned on the bearings and following any positioning adjustments required, the end bracket plates may be welded to angle iron members 50, 52, 54 and 56 in order to complete the generator frame assembly. By the very nature of the frame construction, any adjustments required will be slight and may be made by maneuvering either one or both end bracket plates relative to the angle iron members. Following this welding, the gap setting gages may be removed by pulling them out of position from between the rotor and stator through slots 38, 40. As best shown in FIG. 4, chamfered corners 12, 14, 16 and 18 provide a recess area between the laminations and radiused surfaces 58 of the angle iron members to permit exact seating between the edges of the laminations and surfaces 57, 58. The remainder of generator may then be assembled as is known in the art.

If desired, a sheet metal or expanded metal cover may be provided for the machine. This cover provides protection for and against the internal operative elements of the machine and also provides a neater looking overall unit. This covering, however, does not form a part of the present invention and may be varied as the use of the machine may dictate.

By way of example and for showing the material and labor savings now realized when practicing the concepts of the subject invention, it has been calculated that in manufacturing the end bracket plates from thick steel plate the cost for the raw material was approximately 15¢ per pound; for forging the end bracket plates the cost for the raw material was approximately 33¢ per pound; and, for casting the end bracket plates the cost for the raw material was approximately 20–25¢ per pound. Using the lamination end bracket plates of the subject invention, it has been found that the cost is approximately 8¢ per pound. In prior frames for large electrical machines, the cost of the framework comprised a substantial portion of the total cost of a completed electrical machine whereas using the concepts of the subject invention, the cost of providing a framework is greatly reduced. Further, the number of labor hours required to construct a machine using the concepts of the subject invention are substantially reduced from the number of labor hours required for constructing the same machine using the previously known means.

It is, of course, not necessary to use square laminations for constructing the end bracket plates and the stator as other configurations will suffice adequately and still permit utilization of the invention.

The invention has been described with reference to the preferred embodiment. Obviously, modifications and alterations will occur to others upon the reading and understanding of this specification. It is my intention to include all such modifications and alterations insofar as they come within the scope of the appended claims or the equivalents thereof.

Having thus described my invention I now claim:

1. In an electrical machine comprising a rotor including support bearings, a stator, spaced apart end bracket plates having openings for receiving said support bearings and supporting the rotor in an operative relationship relative to said stator, and connecting members extending between said end bracket plates and supporting said stator, the improvement comprising:
said end bracket plates each being comprised of a stack of a plurality of identically shaped laminations, each lamination having a predetermined thickness insufficient by itself to support said rotor, the number of said laminations in said stack being such as to provide sufficient strength and rigidity to support said rotor, and means connecting said laminations rigidly together into said stack.

2. The improvement as defined in claim 1 wherein said connecting means comprises: a plurality of slots spaced around said openings and extending radially outward therefrom; and, a weld bead in said slots.

3. The improvement as defined in claim 1 wherein said connecting members are rigidly fixed to said end bracket plates.

4. The improvement as defined in claim 3 wherein said end bracket plates are generally rectangular and said connecting members each comprise a length of rigid material having two integral legs joined at substantially right angles to each other, said connecting members extending between the corners of said end bracket plates with the legs of at least two of said connecting members fitting over corners of each said end bracket plate.

5. The improvement as defined in claim 4 wherein said end bracket plates further include recess areas on at least two corners thereof for providing a clearance area for said lengths of angle iron fitted over said corners.

6. The improvement as defined in claim 5 wherein said recess areas comprise chamfers on all corners of said end brackets.

7. In an electrical machine comprising a rotor including support bearings, a stator including a generally rectangular core portion comprised of a stack of a plurality of laminations rigidly affixed to each other and including therein an opening to receive said rotor, spaced apart end bracket plates having openings for receiving said support bearings and supporting the rotor in an operative relationship relative to the stator, and connecting members extending between said end bracket plates and supporting said stator, the improvement comprising:
said connecting members each comprising a length of standard angle iron having two integral legs joined at substantially right angles to each other wherein said legs increase in thickness toward the apex thereof, said connecting members engaging the corners of said core and being rigidly affixed thereto with the legs of at least two of said connecting members fitting over the corners of said core.

8. The improvement as defined in claim 7 wherein said core further includes recess areas on at least two corners thereof for providing a clearance area for said lengths of angle iron fitted over said corners.

9. The improvement as defined in claim 8 wherein said recess areas comprise chamfers on all corners of said core.

10. In an electrical machine comprising: a rotor including support bearings; a stator; spaced apart end bracket plates having openings for receiving said support bearings and supporting the rotor in operative relationship relative to said stator; and connecting members between said end bracket plates and supporting said stator; the improvement comprising:
said end bracket plates each being comprised of a stack of a plurality of identically shaped, generally rectangular laminations, each said lamination having a predetermined thickness insufficient by itself to support said rotor, the number of said laminations being such as to provide sufficient strength and rigidity to support said rotor; said connecting members comprising lengths of standard angle iron having two integral legs joined at substantially right angles to each other and which increase in thickness toward the apex thereof; and, said connecting members extending between corresponding corners of said end bracket plates and rigidly affixed thereto with the legs of at least two of said connecting members fitting over corners of each said end bracket plate.

11. A stator-frame construction for an electrical machine of the type wherein a rotor is rotated relative to a stator, said stator-frame comprising:
a core and end bracket plates which support said rotor, said core being constructed from a stack of a plurality of thin laminations rigidly affixed to each other and including an opening therethrough to receive said rotor, said end bracket plates being axially spaced from said stator; and,
a plurality of elongated connecting members engaged with and rigidly fixed to said stator core, said connecting members overlapping and extending generally equidistantly beyond each end of said core and being rigidly affixed to said end bracket plates, said members being the sole mechanical connection between said core and plates.

12. The stator-frame combination as defined in claim 11 wherein said laminations are rigidly fixed to each other by a plurality of weld beads extending longitudinally along the outside thereof and said connecting members are welded to said core.

13. The stator-frame combination as defined in claim 11 wherein said core is rectangular and said connecting members each comprise a length of rigid material having two integral legs joined at right angles to each other, said connecting members engaging the corners of said core.

14. The stator-frame combination as defined in claim 13 wherein said connecting members comprise lengths of angle iron wherein said legs increase in thickness towards the apex thereof, said core further including recess areas at the corners thereof.

References Cited
UNITED STATES PATENTS

| | | | |
|---|---|---|---|
| 3,512,024 | 5/1970 | Papa | 310—88 |
| 1,794,618 | 3/1931 | Howe | 310—89 |
| 2,489,840 | 11/1949 | White | 310—91 |
| 3,202,851 | 8/1965 | Zimmerle | 29—609 |
| 3,145,313 | 8/1964 | Tupper | 310—90 |
| 3,293,729 | 12/1966 | Morrill | 29—609 |

ROBERT SKUDY, Primary Examiner

U.S. Cl. X.R.

248—2